(12) United States Patent
Trusovs

(10) Patent No.: US 6,392,034 B1
(45) Date of Patent: May 21, 2002

(54) MICROCRYSTALLINE CELLULOSE

(75) Inventor: Sergejs Trusovs, Northridge, CA (US)

(73) Assignee: JH Biotech, Inc., Ventura, CA (US)

( * ) Notice: Subject to any disclaimer, the term of this patent is extended or adjusted under 35 U.S.C. 154(b) by 0 days.

(21) Appl. No.: 09/728,419

(22) Filed: Nov. 28, 2000

Related U.S. Application Data

(60) Provisional application No. 60/204,679, filed on May 17, 2000.

(51) Int. Cl.[7] .......................... C08B 16/00; C07G 17/00
(52) U.S. Cl. ........................... 536/57; 536/56; 536/124
(58) Field of Search ............................. 536/57, 56, 124

(56) References Cited

U.S. PATENT DOCUMENTS

| | | | |
|---|---|---|---|
| 3,954,727 A | | 5/1976 | Toshkov et al. ............. 260/212 |
| 5,057,334 A | * | 10/1991 | Vail ........................... 426/634 |
| 5,346,589 A | | 9/1994 | Braunstein et al. ........... 162/72 |
| 5,769,934 A | | 6/1998 | Ha et al. .................. 106/162.8 |
| 5,976,600 A | | 11/1999 | Ruszkay et al. ............. 426/518 |
| 5,997,905 A | | 12/1999 | McTeigue et al. .......... 424/490 |
| 6,037,380 A | | 3/2000 | Venables et al. ............. 514/781 |

OTHER PUBLICATIONS

Webster's New Collegiate Dictionary, pp. 1087 and 1165. C&G Merriam Company U.S.A. (1979).*

Emil Qtt, Cellulose and Cellulose Derivatives, Chemical Nature, pp. 144–167, Interscience Publishers, Inc. (1954).

Emil Qtt, Cellulose and Cellulose Derivatives: Part 2, Derivatives of Cellulose, pp. 960–970, Interscience Publishers. (1954).

R. Malcolm Brown, Jr., John Blackwell, Cellulos and Other Natural Polymer Systems, The Macromolecular Organization of Cellulose and Chitin, pp. 408–417, Plenum Press. (1982).

T.P. Nevell, Cellulose Chemestry and Its Applications, Oxidation of Cellulose, pp. 160–166, 256, 257, 459, Ellis Horwood Limited Publishers. (1985).

* cited by examiner

*Primary Examiner*—James O. Wilson
*Assistant Examiner*—Zachary Tucker
(74) *Attorney, Agent, or Firm*—Ralph D. Chabot

(57) ABSTRACT

This invention describes a method of MCC production by means of the following process: first, treating a cellulose source material with an alkaline solution which induces swelling of the cellulose source material; second, addition of hydrogen peroxide and/or other peroxides to reduce viscosity; and third, separation of MCC from the suspension. The alkaline MCC obtained must thereafter be treated with an acid solution to become pH neutral. The MCC is separated and is then ready for drying, and subsequent use in commercial applications.

12 Claims, No Drawings

MICROCRYSTALLINE CELLULOSE

This application claims priority to U.S. Provisional Patent Application bearing Ser. No. 60/204,679 dated May 17, 2000.

TECHNICAL FIELD

This invention pertains to the field of manufacturing microcrystalline cellulose.

BACKGROUND OF THE INVENTION

Microcrystalline cellulose (MCC) is a well-known material used in a wide variety of applications in the pharmaceutical and cosmetic industries. MCC is commonly used as a stabilizer or fat replacement in foods as well as for manufacturing items such as tableting aids.

MCC is a highly crystalline particulate cellulose consisting primarily of crystallite aggregates. The prior art has disclosed primarily three methods to obtain the MCC aggregate material.

The first, and most commonly used method for obtaining the crystallite aggregate material, is by subjecting a purified cellulose source material to hydrolytic degradation, typically with a strong mineral acid such as hydrogen chloride. The purified cellulose aggregate material, subjected to the mineral acid, becomes an aggregate having an amorphorus (fibrous cellulose) phase and MCC phase. The amorphous phase is removed leaving the MCC.

U.S. Pat. No. 3,954,727 (Toshkov et al.), describes various hydrolysis methods for obtaining high grade MCC at elevated temperatures (up to 160 deg C) in the presence of either hydrochloric or sulfuric acid.

There are however, safety concerns which must be overcome with the acid hydrolysis method for producing MCC. These concerns are related to the high temperature requirements and the corrosive nature of an acid solution in a high temperature/high pressure environment.

A second method for obtaining MCC is described in U.S. Pat. No. 5,769,934 (Ha, et al.). MCC is produced by using pressurized steam at elevated temperatures of between 180 C up to 350 C. Although acid in a high temperature environment is avoided, there still remains the safety issues associated with a high temperature/pressure application.

A third method for manufacture of MCC is disclosed in U.S. Pat. No. 5,346,589 (Braunstein, et al.) which describes a method for producing cellulose with high crystallinity by enzymatic hydrolysis. Although a high temperature/pressure environment is avoided, the disclosure indicates a required reaction time of between 24 to 48 hours. This prolonged reaction time may be unsuitable for commercial application.

The prior art methods discussed above are based on removal of the amorphous (fibrous cellulose) regions from the purified cellulose source material.

Treatment of natural cellulose with aqueous sodium hydroxide will cause cellulose material to swell. The extent of swelling depends on such factors as the treatment temperature, treatment time, the concentration of the caustic solution and the fiber assembly and tension.

A well-known process, known as mercerization, involves swelling native cellulose in caustic soda followed by removal of the swelling agent. Mercerization is commonly used to modify the properties of the cotton fibers (native cellulose).

Use of alkaline solutions for treatment of raw cellulose material has also been reported in the production of viscose rayon. As described in E.Ott. *Cellulose and Cellulose Derivatives*, p.966–970 New York Inter-science Publishers, cellulose raw material is treated with 14–20% sodium hydroxide in a process known as steeping. The treated cellulose is then subjected to pressing in order to remove most of the sodium hydroxide. The pressed cellulose is then shredded, thereafter aged and then subjected to carbon disulfide to obtain viscose. Alkaline treatment of cellulose however, has not been utilized for the production of MCC.

The prior art production methods for MCC are based on acidic hydrolysis of the amorphous part of cellulose and thereafter separation of the crystalline portion. Although the prior art also discloses alkaline treatments of cellulose, these treatments only focus on enhancing the strength properties of cotton fibers or for production of viscose.

DISCLOSURE OF THE INVENTION

This invention describes a method for obtaining MCC by treating a cellulose source material with an alkaline solution and thereafter de-polymerizing the cellulose material with hydrogen peroxide and/or other peroxides.

Accordingly, it is an object of the invention to provide a method for producing MCC which does not involve high temperature/high pressure applications.

It is a further object of the invention to provide a method for producing MCC in an economically efficient manner utilizing readily available chemicals and cellulose source materials.

Cellulose source materials can be raw materials such as wood, paper, and cotton, which have been conditioned for use in the process. In other words, the cellulose source materials should be in a physical condition for use in making pulp. Other raw materials such as straw, bagasse, and cornstalks may also be considered. The latter group would require additional separation steps which would be necessary for removing non-cellulose materials from the process.

Production of MCC according to the invention requires the stirring of cellulose source material in an alkaline solution between room temperature and boiling temperature i.e. 20 deg C and 100 deg C to induce swelling of the source material. Thereafter, hydrogen peroxide is added and mixed with the alkaline cellulose suspension. Dry alkali, in the form of potassium hydroxide, or sodium hydroxide, can be used in concentrations as low as 3% by weight to as high as 50% by weight. A concentration range of 4%–20% is preferred and most preferred is a concentration range between 5%–10%.

Although hydrogen peroxide is a common bleaching agent, its primary function is to reduce the suspension's viscosity. It is believed this is accomplished by oxidizing and de-polymerizing the swollen suspension which results in a lower viscosity.

The actual process is as follows: first, treating a cellulose source material with an alkaline solution at a temperature between 20 deg C and 100 deg C; second, adding hydrogen peroxide or another type of peroxide solution to reduce the viscosity of the alkaline suspension; third, separate the alkaline MCC from the filtrate; fourth, combine the alkaline MCC obtained with a sufficient amount of water and acid to adjust the MCC pH to approximately 7.0; and fifth, separate the MCC from solution a second time to obtain a pH neutral MCC which can thereafter be dried and milled into a powder and used for commercial applications.

It is important to realize that the techniques for separating MCC from the filtrate can involve common commercially available separation techniques such as filters or centrifuges.

My invention differs from prior art methods of producing MCC by subjecting the cellulose source material to an alkaline solution. Preferably, potassium hydroxide is used although sodium hydroxide can be used in the alternative or in combination.

The cellulose source material is mixed in an alkaline solution for a period of time. The higher the mixing temperature the less time is required to reach maximum swelling of the cellulose source material.

At the point where the cellulose source material has completely swollen, it is necessary that there still be a sufficient amount of alkaline solution to permit continued mixing of the suspension. Next, hydrogen peroxide is added to the mixing suspension, to de-polymerize the cellulose thereby reducing its viscosity. The addition of hydrogen peroxide and continued mixing results in a reduced viscosity of the pulp suspension. Once the viscosity of this solution reaches a minimum, the solution is filtered leaving alkaline MCC. Because the liquid solution is still viscous it is necessary to filter using a vacuum or centrifuge, depending upon the separation technique to be used.

Once separation is complete, it is necessary to neutralize the alkaline MCC. This is accomplished by adding the alkaline MCC to a sufficient amount of water and adjusting the pH as necessary. Typically, this means using a small amount of acid, preferably, hydrochloric acid. However, other suitable acids to perform this neutralizing function can include but are not limited to: sulfuric acid, nitric acid, acetic acid, citric acid, and oxalic acid.

As mentioned above, hydrogen peroxide is used to depolymerize the swollen cellulose. Other suitable alternatives to hydrogen peroxide include: sodium peroxide, sodium persulfate, sodium perborate, potassium persulfate, potassium percarbonate, and, urea hydrogen peroxide.

DETAILED DESCRIPTION OF THE PREFERRED EMBODIMENT

The following six examples are provided to illustrate different conditions for obtaining MCC according to the invention.

The examples described below use high purity cellulose. Some examples use as a source material pure cotton and some use cut filter paper. Again, the purpose of the examples are to illustrate that MCC can be obtained using an alkaline solution at temperatures between room temperature and atmospheric boiling temperature, followed by the addition of hydrogen peroxide.

EXAMPLE 1

Add 900 ml water and 70 gr. of cut filter paper into a laboratory reactor having a mechanical stirrer and jacket. Thereafter, add 70 ml of 50% KOH solution. Turn on stirrer and heat the mixture to 75 C. Maintain the mixture at 75 C and continue to stir for 4–5 hours. Thereafter, begin adding 70 ml of 35% hydrogen peroxide slowly to the mixture over a period of approx 1 hour. Continue to stir for an additional 1–2 hours (Dissolves amorphous portion). Filter suspension. The filtrate, which includes the alkali solution, the water which was initially present and the water produced by the reaction of hydrogen peroxide and cellulose source material, may be used several times. Place the remaining cellulose mass (which has an alkaline pH) back into the reactor, add enough water to facilitate mixing and adjust the pH to approx 7.0 by adding several drops of concentrated HCl to neutralize the alkali remaining within the cellulose mass. Filter the microcrystalline cellulose suspension, wash with water, then dry and mill. 67 grams of microcrystalline cellulose obtained.

EXAMPLE 2

Add 900 ml water and 80 grams of cut filter paper into a laboratory reactor provided with mechanical stirrer and jacket. Thereafter, add 140 ml of 50% KOH solution. Turn on stirrer and heat the mixture to 75 C. Maintain the mixture at 75 C and continue to stir for 1 hour. Thereafter, begin adding 60 ml of 35% hydrogen peroxide slowly to the mixture over a period of approx 1 hour. Continue to stir for an additional 2–3 hours. Filter suspension. Place the remaining cellulose mass (which has an alkaline pH) back into the reactor, add enough water to facilitate mixing and adjust the pH to approx 7.0 by adding several drops of concentrated HCl. Filter the microcrystalline cellulose suspension, wash with water, then dry and mill. 68 gr. of microcrystalline cellulose obtained.

EXAMPLE 3

Add 900 ml water and 60 gr. of cut filter paper into a laboratory reactor provided with mechanical stirrer and jacket. Thereafter, add 70 ml of 50% KOH solution. Turn on stirrer and heat the mixture to 75 C. Maintain the mixture at 75 C. and continue to stir for 3 hours. Thereafter begin adding 35 ml of 35% hydrogen peroxide slowly to the mixture over a period of approx 1 hour. Continue to stir for an additional 1–2 hours. Filter suspension. Place the remaining cellulose mass (which has an alkaline pH) back into the reactor, add enough water to facilitate mixing and adjust the pH to approx 7.0 by adding several drops of concentrated HCl . Filter the microcrystalline cellulose suspension, wash with water, then dry and mill. 58 gr. of microcrystalline cellulose obtained.

EXAMPLE 4

Add 900 ml water and 48 gr. of pure cotton into a laboratory reactor provided with mechanical stirrer and jacket. Thereafter, add 70 ml of 50% KOH solution. Turn on stirrer and heat the mixture to 75 C. Maintain the mixture at 75 C and continue to stir for 3–4 hours. Thereafter, begin adding 45 ml of 35% hydrogen peroxide slowly to the mixture over a period of approx 1 hour.

Continue to stir for 1–2 hours. Filter suspension. Place the remaining cellulose mass (which has an alkaline pH) back into the reactor, add enough water to facilitate mixing and adjust the pH to approx 7.0 by adding several drops of concentrated HCl . Filter the microcrystalline cellulose suspension, wash with water, then dry and mill. 44 gr. of microcrystalline cellulose obtained.

EXAMPLE 5

Add 900 ml water and 45 gr. of pure cotton into a laboratory reactor provided with mechanical stirrer and jacket. Thereafter, add 100 ml of 50% KOH solution. Turn on stirrer and heat the mixture to 75 C. Maintain the mixture at 75 C. and continue to stir for 3–4 h. Thereafter, begin adding 50 ml of 35% hydrogen peroxide slowly to the mixture over a period of approx 1 hour. Continue to stir for an additional 1–2 hours. Filter suspension. Place the remaining cellulose mass back into the reactor, add enough water to facilitate mixing and adjust the pH to approx 7.0 by adding several drops of concentrated HCl. Filter the microcrystalline cellulose suspension, wash with water, then dry and mill. 43 gr. of microcrystalline cellulose obtained.

EXAMPLE 6

Add 900 ml water and 43 gr. of pure cotton into a laboratory reactor provided with mechanical stirrer and jacket. Thereafter, add 100 ml of 50% KOH solution. Maintain at room temperature for 17 hours. Afterwards, heat mixture to 75 deg C. and slowly add 60 ml of 35% hydrogen peroxide over a period of approx 1 hour. Continue to stir for an additional 1–2 hours. Filter suspension. Place the remaining cellulose mass (which has an alkaline pH) back into the reactor, add enough water to facilitate mixing and adjust the pH to approx 7.0 by adding several drops of concentrated HCl. Filter microcrystalline cellulose suspension, wash with water, then dry and mill. 39 gr. of microcrystalline cellulose obtained.

TABLE 1

Test Results

| | Example 1 | Example 2 | Example 3 | Example 4 | Example 5 | Example 6 |
|---|---|---|---|---|---|---|
| Initial $H_2O$ (ml) | 900 | 960 | 900 | 900 | 900 | 900 |
| Cut filter paper (gm) | 70 | 80 | 60 | | | |
| Pure cotton (gm) | | | | 48 | 45 | 43 |
| 50% KOH (ml) | 70 | 140 | 70 | 70 | 100 | 100 |
| 35% $H_2O_2$ (ml) | 70 | 60 | 35 | 45 | 50 | 60 |
| MCC obtained (gm) | 67 | 76 | 58 | 44 | 43 | 39 |
| MCC Recovery (%) | 95.7 | 95.0 | 96.6 | 91.6 | 95.5 | 90.7 |

All examples used either filter paper or cotton as the cellulose source material. Water and KOH were added and the mixture was stirred at 75 C for 4–5 hours except for example 6 which was maintained at room temperature without stirring for 17 hours. In all examples, the cellulose source material was treated with potassium hydroxide which caused it to swell. Continuing to mix the suspension, hydrogen peroxide was added to de-polymerize the swollen cellulose suspension, reducing the suspension viscosity. The values obtained for MCC represent the quantity obtained following pH neutralization.

I claim:

1. A method for producing microcrystalline cellulose comprising the steps of:
   providing a cellulose source material derived from cotton fibers or paper;
   providing an alkaline solution;
   adding the cellulose source material to said alkaline solution so that said alkaline solution is between 3–50% by weight of an alkaline substance;
   mixing said cellulose source material with said alkaline solution for between two and twenty hours at a temperature of between 20 and 100 degrees Celsius within which time said cellulose source material swells into a suspension;
   thereafter, adding a sufficient amount of hydrogen peroxide to said suspension and said alkaline solution and mixing between 20 and 80 degrees Celsius for between two and twenty hours, said sufficient amount of hydrogen peroxide oxidizing the suspension into a less viscous suspension;
   filtering said less viscous suspension to obtain alkaline microcrystalline cellulose;
   thereafter, combining said alkaline microcrystalline cellulose with a sufficient amount of water and acid to obtain a pH neutral solution; and, filtering microcrystalline cellulose from said pH neutral solution.

2. The method for producing microcrystalline cellulose described in claim 1 wherein said alkaline solution is selected from the group comprising solutions of potassium hydroxide or sodium hydroxide.

3. The method for producing microcrystalline cellulose described in claim 1 wherein said alkaline solution is in the range of 4–20% by weight of an alkaline substance.

4. The method for producing microcrystalline cellulose described in claim 1 wherein said alkaline solution is in the range of 5–10% by weight of an alkaline substance.

5. A method for producing microcrystalline cellulose comprising the steps of:
   mixing a cellulose source material derived from cotton fibers or paper with an alkaline solution to yield a swollen suspension;
   thereafter, while continuing to mix, de-polymerizing said swollen suspension by addition of hydrogen peroxide to form a less viscous suspension having a uniform consistency;
   filtering said less viscous suspension to obtain alkaline microcrystalline cellulose;
   thereafter, treating said alkaline microcrystalline cellulose with a sufficient amount of water and acid to obtain a pH neutral solution; and,
   filtering microcrystalline cellulose from said pH neutral solution.

6. The method for producing microcrystalline cellulose described in claim 5 wherein said alkaline solution is in the range of 3–50% by weight of an alkaline substance.

7. The method for producing microcrystalline cellulose described in claim 5 wherein said alkaline solution is in the range of 4–20% by weight of an alkaline substance.

8. The method for producing microcrystalline cellulose described in claim 5 wherein said alkaline solution is in the range of 5–10% by weight of an alkaline substance.

9. A method for producing microcrystalline cellulose comprising the steps of:
   mixing a cellulose source material derived from cotton fibers or paper with an alkaline solution to yield a highly viscous suspension;
   thereafter, adding an oxidizer to change said highly viscous suspension into a less viscous suspension having a uniform consistency and suspended alkaline microcrystalline cellulose therein;
   separating said alkaline microcrystalline cellulose;
   thereafter, adjusting the pH of said alkaline microcrystalline cellulose to obtain a pH neutral microcrystalline cellulose.

10. The method for producing microcrystalline cellulose described in claim 9 wherein said alkaline solution is in the range of 3–50% by weight of an alkaline substance.

11. The method for producing microcrystalline cellulose described in claim 9 wherein said alkaline solution is in the range of 4–20% by weight of an alkaline substance.

12. The method for producing microcrystalline cellulose described in claim 9 wherein said alkaline solution is in the range of 5–10% by weight of an alkaline substance.

* * * * *